US010120633B2

(12) United States Patent
Iezaki

(10) Patent No.: US 10,120,633 B2
(45) Date of Patent: Nov. 6, 2018

(54) DISPLAY SYSTEM, PORTABLE DISPLAY DEVICE, DISPLAY CONTROL DEVICE, AND DISPLAY METHOD

(71) Applicant: Seiko Epson Corporation, Tokyo (JP)

(72) Inventor: Hiroshi Iezaki, Sapporo (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 15/001,578

(22) Filed: Jan. 20, 2016

(65) Prior Publication Data
US 2016/0219159 A1   Jul. 28, 2016

(30) Foreign Application Priority Data
Jan. 26, 2015  (JP) ................................. 2015-012008

(51) Int. Cl.
*G06F 3/14*   (2006.01)
*G06F 3/147*   (2006.01)
*G06F 3/12*   (2006.01)

(52) U.S. Cl.
CPC ............ *G06F 3/1423* (2013.01); *G06F 3/147* (2013.01); *G09G 2358/00* (2013.01)

(58) Field of Classification Search
CPC ........ G06F 3/011; G06F 3/1423; G06F 3/147; G06Q 10/0631; G06Q 10/06311; G06Q 10/06315; G06Q 10/06316; G06Q 10/0633; G09G 2358/00; G02B 27/017; G06T 19/006; H04N 1/00129; H04N 1/00244; H04N 1/00344

USPC ....... 358/1.11–1.18, 504, 406; 345/633, 629; 707/102, 999.102; 399/9, 11–13, 18–24, 399/81; 710/15, 18, 19
See application file for complete search history.

(56) References Cited

U.S. PATENT DOCUMENTS

| | | | |
|---|---|---|---|
| 6,750,878 B1* | 6/2004 | Tatsuo | B41J 3/46 399/81 |
| 2005/0024388 A1 | 2/2005 | Takemoto | |
| 2007/0198571 A1* | 8/2007 | Ferguson | G06Q 10/0631 |
| 2007/0201884 A1* | 8/2007 | Yamada | G03G 15/70 399/21 |
| 2011/0254859 A1 | 10/2011 | Matsuda | |
| 2012/0192077 A1* | 7/2012 | Castellani | G03G 15/5079 715/740 |
| 2013/0027430 A1 | 1/2013 | Matsuda et al. | |
| 2013/0069985 A1* | 3/2013 | Wong | G02B 27/017 345/633 |
| 2013/0120449 A1 | 5/2013 | Ihara et al. | |
| 2013/0278635 A1* | 10/2013 | Maggiore | G06T 19/006 345/633 |
| 2014/0126018 A1 | 5/2014 | Sugimoto | |

(Continued)

FOREIGN PATENT DOCUMENTS

JP  2014-233201 A  8/2004
JP  2005-049996 A  2/2005

(Continued)

*Primary Examiner* — Chad Dickerson
(74) *Attorney, Agent, or Firm* — Harness, Dickey & Pierce, P.L.C.

(57) ABSTRACT

There is provided a display system which includes a first display device; a second display device; a storage device that divides work for a work object and stores a first work content and a second work content; and a control device that displays the first work content on the first display device and displays the second work content on the second display device.

15 Claims, 10 Drawing Sheets

FIRST HMD

PAPER DEPLETION ERROR OCCURS

(56) References Cited

U.S. PATENT DOCUMENTS

| | | | |
|---|---|---|---|
| 2014/0240347 A1* | 8/2014 | Murakami | G02B 27/017 345/629 |
| 2014/0240484 A1* | 8/2014 | Kodama | G02B 27/017 348/86 |
| 2014/0285521 A1 | 9/2014 | Kimura | |
| 2014/0327603 A1 | 11/2014 | Hiraide | |
| 2015/0002394 A1 | 1/2015 | Cho et al. | |
| 2015/0376868 A1* | 12/2015 | Jackson | E02F 9/2025 701/50 |

FOREIGN PATENT DOCUMENTS

| | | |
|---|---|---|
| JP | 2007-188467 A | 7/2007 |
| JP | 2011-227644 A | 11/2011 |
| JP | 2011-227649 A | 11/2011 |
| JP | 2011-245792 A | 12/2011 |
| JP | 2011-248860 A | 12/2011 |
| JP | 2012-137525 A | 7/2012 |
| JP | 2013-077328 A | 4/2013 |
| JP | 2013-242865 A | 12/2013 |
| JP | 2014-093036 A | 5/2014 |
| JP | 2014-164374 A | 9/2014 |
| JP | 2014-164482 A | 9/2014 |
| JP | 2014-186434 A | 10/2014 |
| JP | 2014-219468 A | 11/2014 |
| JP | 2014-225823 A | 12/2014 |

* cited by examiner

FIRST HMD

PAPER DEPLETION ERROR OCCURS

SECOND HMD

PAPER DEPLETION ERROR OCCURS

FIRST HMD

PLEASE OPEN COVER

SECOND HMD

PAPER DEPLETION ERROR OCCURS

FIRST HMD

SECURELY INSERT LEFT ROLL HOLDER.
SEQUENTIALLY, TIGHTEN AND FIX ROLL HOLDER
FIXING SCREW SUCH THAT ROLL HOLDER DOES NOT MOVE.

SECOND HMD

SECURELY INSERT RIGHT ROLL HOLDER.
SEQUENTIALLY, TIGHTEN AND FIX ROLL HOLDER
FIXING SCREW SUCH THAT ROLL HOLDER DOES NOT MOVE.

FIRST HMD

PLEASE CLOSE COVER

SECOND HMD

DISPLAY SYSTEM, PORTABLE DISPLAY DEVICE, DISPLAY CONTROL DEVICE, AND DISPLAY METHOD

BACKGROUND

1. Technical Field

The present invention relates to a technology which supports a plurality of workers who divide work for a work object.

2. Related Art

In JP-A-2005-49996, when a virtual object is displayed by Head Mounted Displays (HMDs) which are respectively mounted on two workers, a visual field area, which is viewed by one worker through the HMD, is displayed as the virtual object in the HMD of another worker. In this manner, another worker can understand the visual field area which is viewed by one worker. As a result, when an object is delivered to one worker from another worker, another worker can present the object to one worker such that the object is settled into the visual field area of one worker, thereby enabling the object to be smoothly delivered.

However, for example, in a printer, various events, such as a paper jam or low ink, are generated, and thus it is necessary for workers to appropriately perform works (to fix the paper jam, to replenish ink, and the like) corresponding to the respective events. At this time, there is a case in which division of work is performed for a work object, such as the printer, and the resulting works are performed by a plurality of workers. Here, it is suitable if work contents are displayed on a display device, such as the HMD, and the workers can support the work. However, the technology disclosed in JP-A-2005-49996 does not address a problem, at all, in that not only work contents should be displayed on display devices but also division performed by a plurality of workers should be supported by displaying the work contents on the display devices.

SUMMARY

An advantage of some aspects of the invention is to provide a technology which supports a plurality of workers who divide work for a work object and which enables the respective workers to easily execute their own work contents.

According to an aspect of the invention, there is provided a display system including: a first display device; a second display device; a storage device that divides work for a work object and stores a first work content and a second work content; and a control device that displays the first work content on the first display device and displays the second work content on the second display device.

According to another aspect of the invention, there is provided a portable display device portable display device including: a reception section that receives a part of work contents from a storage section which divides work for a work object and stores a plurality of work contents; and a display section that displays the part of work contents.

According to still another aspect of the invention, there is provided a display control device including: a storage section which divides work for a work object and stores a plurality of work contents; and a control section that causes the plurality of work contents to be separately displayed on a first display device and a second display device.

According to still another aspect of the invention, there is provided a display method including: displaying a first work content of the first work content and a second work content, which are acquired by dividing work for a work object, on a first display device; and displaying the second work content on a second display device.

In the invention (the display system, the display control device, and the display method) which is configured as described above, the work contents of the workers for the work object is displayed on a display device which is used by a worker. Accordingly, the workers can easily execute their own work contents on the work object.

In addition, the display system may be configured such that, when the first work content or the second work content has a plurality of procedures, the control device sequentially displays the plurality of procedures on the first display device or the second display device. In this manner, the workers can securely execute the plurality of procedures while sequentially checking the plurality of procedures.

In addition, the display system may be configured such that the control device switches the procedures which are displayed on the first display device or the second display device according to change in state of the work object detected by the work object. In this manner, it is possible to show suitable procedures for the work object according to the progress of the work on the display device.

Specifically, the display system may be configured such that change in the state of the work object, which is generated in accordance that the second work content is executed, is detected. In this manner, it is possible to show suitable procedures according to the progress of the work, which is executed by another worker (second worker), on the display device of the worker (first worker).

In addition, the display system may be configured such that the control device receives an input manipulation for progress of the work for the work object, and switches the procedure in which display is performed on the first display device or the second display device according to an input result of the progress of the work. In this manner, it is possible to show suitable procedures for the work object according to the progress of the work on the display device.

Specifically, the display system may be configured such that the control device receives manipulation of the second worker who inputs the progress of the second work content. In this manner, it is possible to show suitable procedures according to the progress of the work, which is performed by another worker (second worker) on the display device of the worker (first worker).

In addition, the display system may be configured such that the control device shows locations where the first work content or the second work content is executed for the work object, and performs display on the first display device or the second display device. In this manner, the workers can accurately understand the execution locations of the work contents and can execute the work contents.

In addition, the display system may be configured such that the first work content and the second work content are different from each other. In the display system, the respective workers can execute different work contents on the same work object according to the display of the display device, and thus it is possible to perform complicated work as a group.

In addition, the display system may be configured such that the control device has a function of showing timing, in which the first work content and the second work content are simultaneously executed, on the first display device and the second display device. In this manner, it is possible to easily combine timings in which the respective workers execute the work.

In addition, the display system may be configured such that the first display device and the second display device include a portable display device. In the display system, the workers can execute the work contents while carrying the display devices, thereby providing high convenience for the workers.

In addition, the display system may be configured such that the work object includes a printer, and the control device includes a server which is embedded in the printer, a server which is independently provided on an outside of the printer, or a controller which is embedded in the display device.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
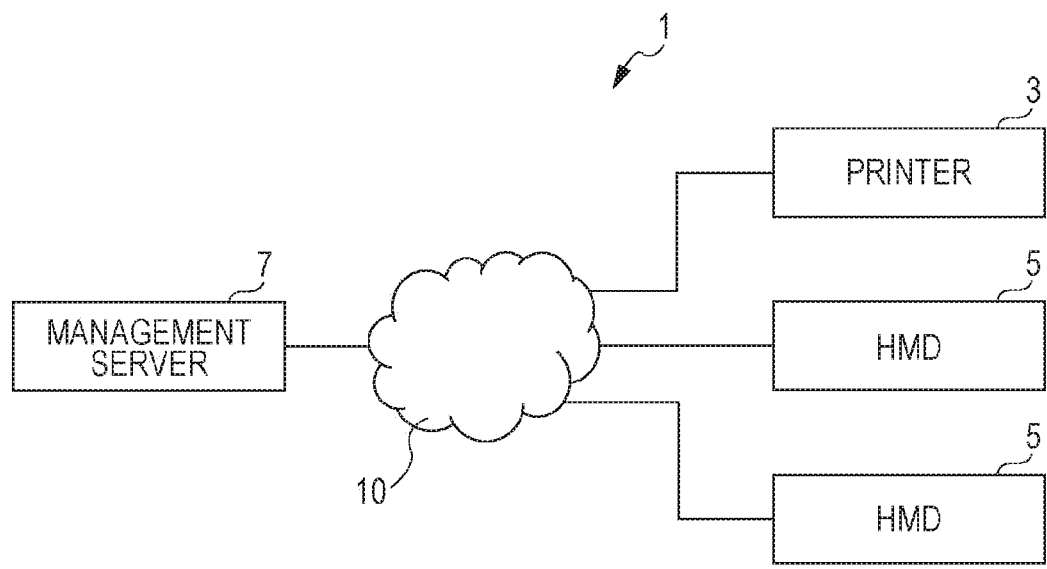
FIG. 1 is a block diagram schematically illustrating an example of a display system according to the invention.

FIG. 1 is a block diagram schematically illustrating an example of a display system according to the invention. A display system 1 includes a printer 3 which is a work object of workers, HMDs 5 which display work contents to the workers, and a management server 7 which manages the printer 3 and the HMDs 5. Here, a plurality of HMDs 5 are provided such that each of the plurality of workers wears one HMD 5 and division of work for the printer 3 is performed.

The printer 3, the HMD 5, and the management server 7 are respectively connected to the Internet 10, and the management server 7 performs communication between the printer 3 and the HMD 5 through the Internet 10. Meanwhile, the Internet 10 is shown as an example of a communication line, and a detailed configuration, which realizes the communication between the printer 3, each of the HMDs 5, and the management server 7, is not limited to the Internet 10.

The display system 1 is suitable for supporting a plurality of workers who divide work for the printer 3. That is, when an event, such as a paper jam or low ink, occurs in the printer 3, the management server 7 specifies work contents which should be performed for the event by the respective workers, and displays work contents corresponding to the HMDs 5 (a first display device, a second display device, and the like) which are mounted on the respective workers. In this manner, when the workers execute the work contents displayed on the HMDs 5 which are mounted on the workers, the workers can perform suitable work (to fix the paper jam, to replenish ink, and the like) according to the event on the printer 3 in cooperation with other workers.

Figure 2:
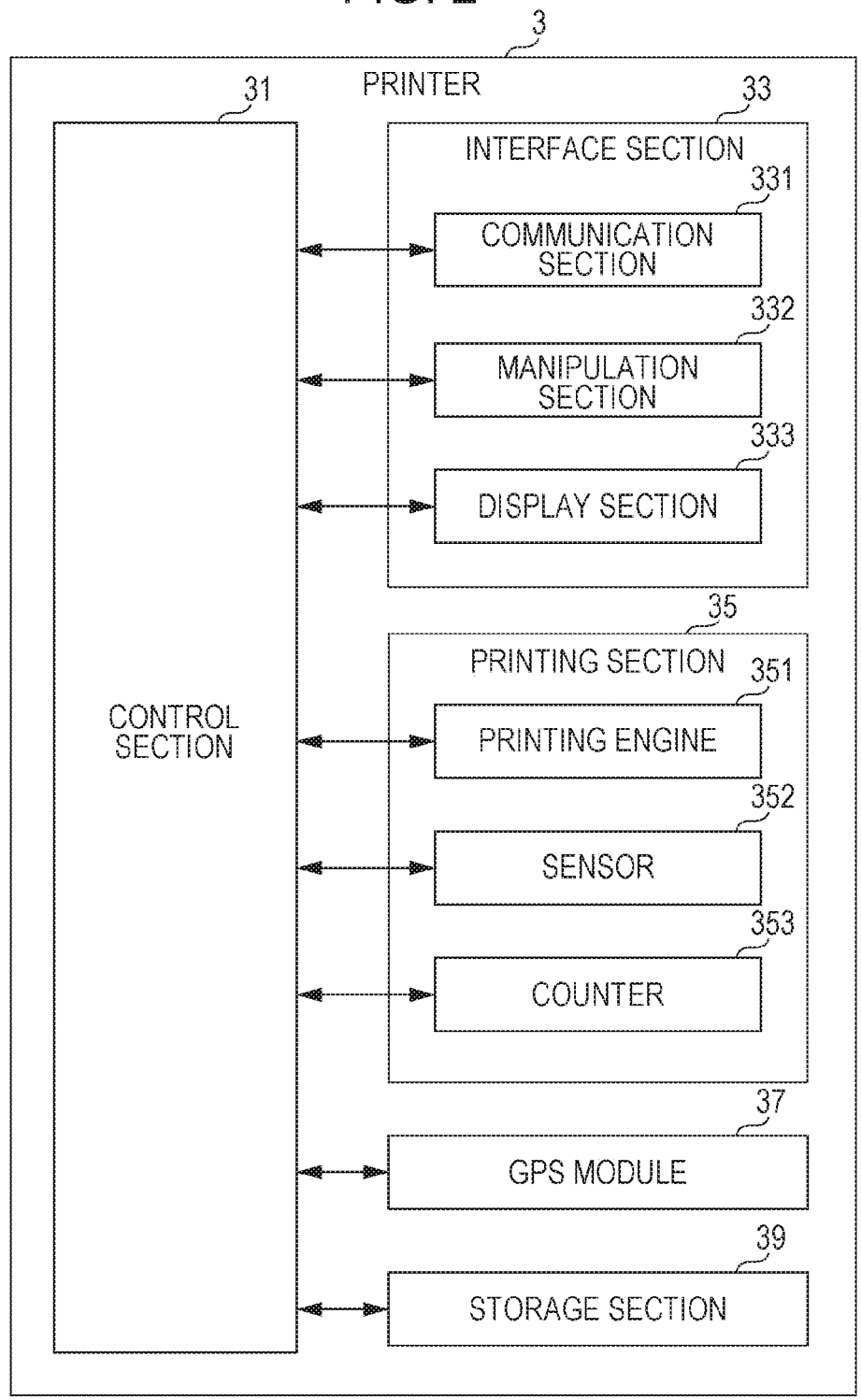
FIG. 2 is a block diagram illustrating an example of the configuration of a printer.

FIG. 2 is a block diagram illustrating an example of the configuration of the printer. The printer 3 includes a control section 31, an interface section 33, a printing section 35, a Global Positioning System (GPS) module 37, and a storage section 39. The control section 31 is a computer which includes a Central Processing Unit (CPU) and a Random Access Memory (RAM), and integrally controls operations which are performed in the printer 3. Accordingly, the interface section 33, the printing section 35, the GPS module 37, and the storage section 39 are operated under the control of the control section 31.

The interface section 33 performs an interface function between the printer 3 and an external device or the workers. A communication section 331 is connected to the Internet 10, and performs communication with the management server 7 through the Internet 10. In addition, a manipulation section 332 includes buttons which receive input manipulation from the workers, and a display section 333 includes a display or the like which displays various information relevant to the printer 3 to the workers. Meanwhile, the manipulation section 332 and the display section 333 may be integrally formed using, for example, a touch panel.

The printing section 35 includes a printing engine 351, a sensor 352 and a counter 353. The printing engine 351 has a mechanical configuration in which an image is printed on a printing medium. The printing engine 351 prints an image on a printing medium by discharging ink from an ink jet type discharge to a winding-type printing medium (web) which is transported roll to roll. Meanwhile, the detailed configuration of the printing engine 351 is not limited the example described here. The printing engine 351 may perform printing on a sheet-type printing medium or may perform printing using a toner in a laser printing manner. Further, the sensor 352 detects the state of the printing engine 351, and the counter 353 counts various numerical values which change in accordance with the operation of the printing engine 351.

The state of the printing engine 351 includes, for example, a printing medium transport state, the opening and closing state of the cover of a main body, the attachment state of various components, and the like. The sensor 352 is provided to detect the states. In addition, the numerical values, which change in accordance with the operation of the printing engine 351, include, for example, the integrated length of a printed web, ink consumption (or the amount of remaining ink), the integrated rotation amount of rotating mechanical components (for example, a roller which transports the printing medium), and the like. Various types of counters 353 are provided to count the numerical values.

The GPS module 37 detects the installation location of the printer 3 using a satellite location system. In addition, the storage section 39 includes a storage medium, such as a Read Only Memory (ROM), a Hard Disk Drive (HDD) or RAM, and stores various programs or data which are used in the printer 3.

Figure 3:
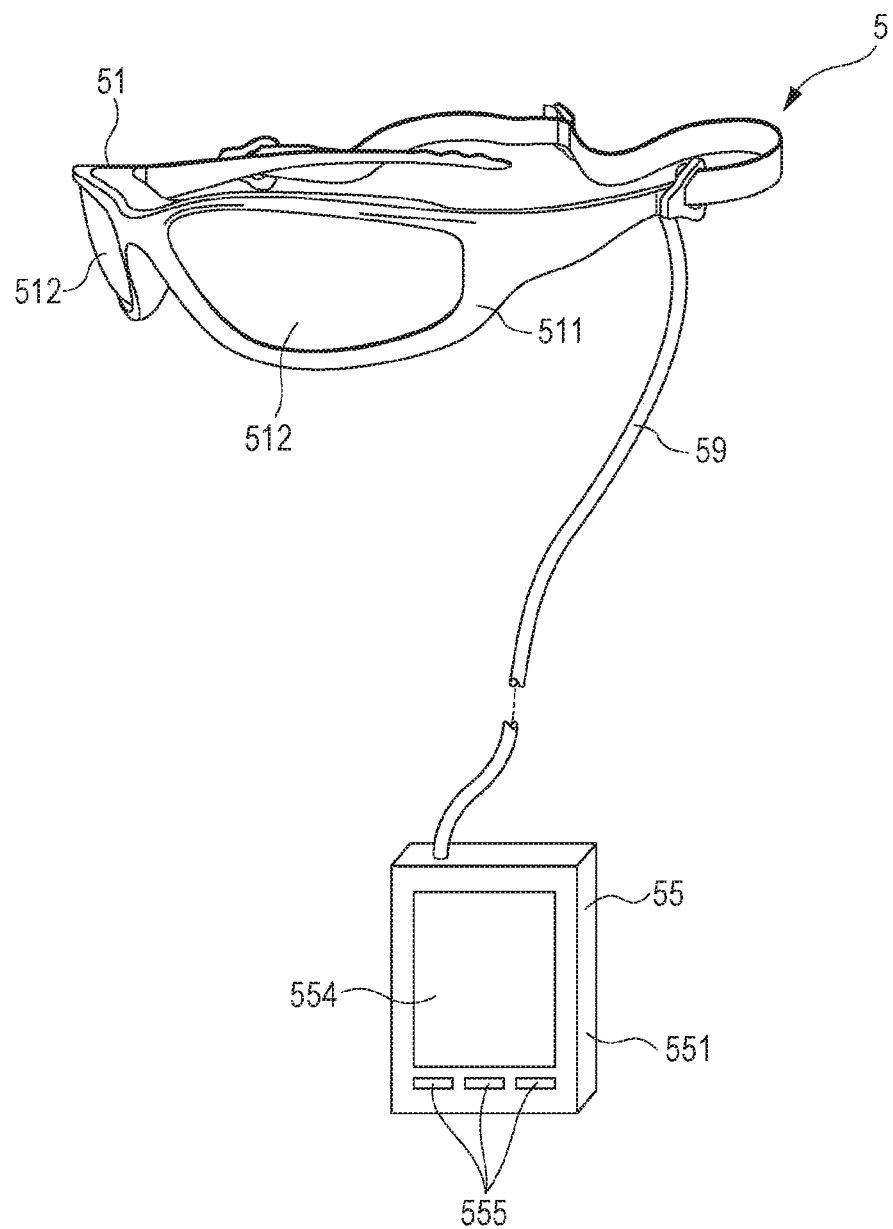
FIG. 3 is a diagram schematically illustrating an example of the mechanical configuration of an HMD.
Figure 4:
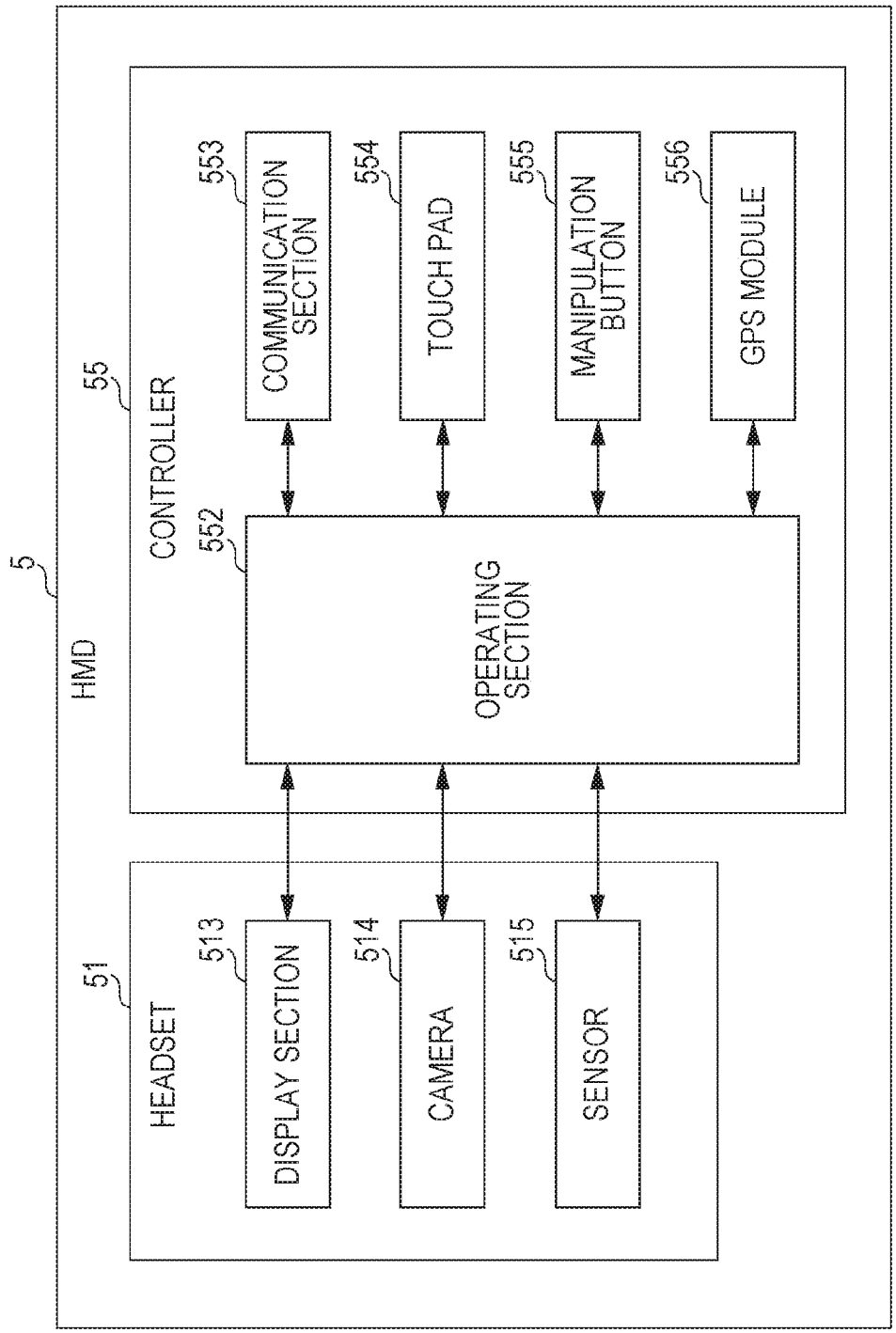
FIG. 4 is a block diagram illustrating an example of an electrical configuration included in the HMD of FIG. 3.

FIG. 3 is a diagram schematically illustrating an example of the mechanical configuration of an HMD. FIG. 4 is a block diagram illustrating an example of an electrical configuration included in the HMD of FIG. 3. The HMD 5 includes a headset 51 which is mounted on a worker, a portable controller 55, and a cable 59 which connects the headset 51 to the controller 55. The HMD 5 is, for example, a light transmission type HMD which includes the same configurations as a virtual image display device disclosed in JP-A-2014-219468 and JP-A-2014-225823.

The headset 51 includes a glass type frame 511, which can be mounted on the head of the worker, and lenses 512 which are attached to the frame 511. The respective lenses 512 are located in front of the left and right eyes of the worker who wears the frame 511, and transmit visible light. Accordingly, the worker who wears the headset 51 can visually recognize a peripheral situation through the respective lenses 512. Further, a display section 513, which displays an image indicative of work contents of the work to the worker, is embedded in the frame 511. Accordingly, the worker who wears the headset 51 can visually recognize an image which is displayed by the display section 513. In other words, the headset 51 can display an image, which is generated by the display section 513, to overlap the peripheral situation through the lenses 512. Meanwhile, the display section 513 may be a type in which a virtual image is displayed or a type in which the virtual image is formed on the retinas of the worker. In addition, a camera 514, which images the peripheral situation, and a sensor 515, which detects the bearing of the headset 51, are attached to the frame 511.

The controller 55 has a configuration in which an operating section 552, a communication section 553, a touch pad 554, manipulation buttons 555, and a GPS module 556 are attached to a portable housing 551 which can be carried in such a way that the worker puts the controller into the pocket of cloth or can be carried in hand. The operating section 552 is a computer which includes a CPU and a RAM, and integrally performs operation processes in the HMD 5. The communication section 553 is connected to the Internet 10, and performs communication with the management server 7 through the Internet 10. The touch pad 554 and the manipulation buttons 555 function as user interfaces, respectively. That is, when the worker performs input manipulation on the touch pad 554 or the manipulation buttons 555, the operating section 552 controls the display section 513 according to the input manipulation. In this manner, it is possible to perform display control such as the change in the location or content of an image to be displayed to the worker according to the manipulation which is input by the worker. The GPS module 556 detects the location of the HMD 5 using the satellite location system.

Figure 5:
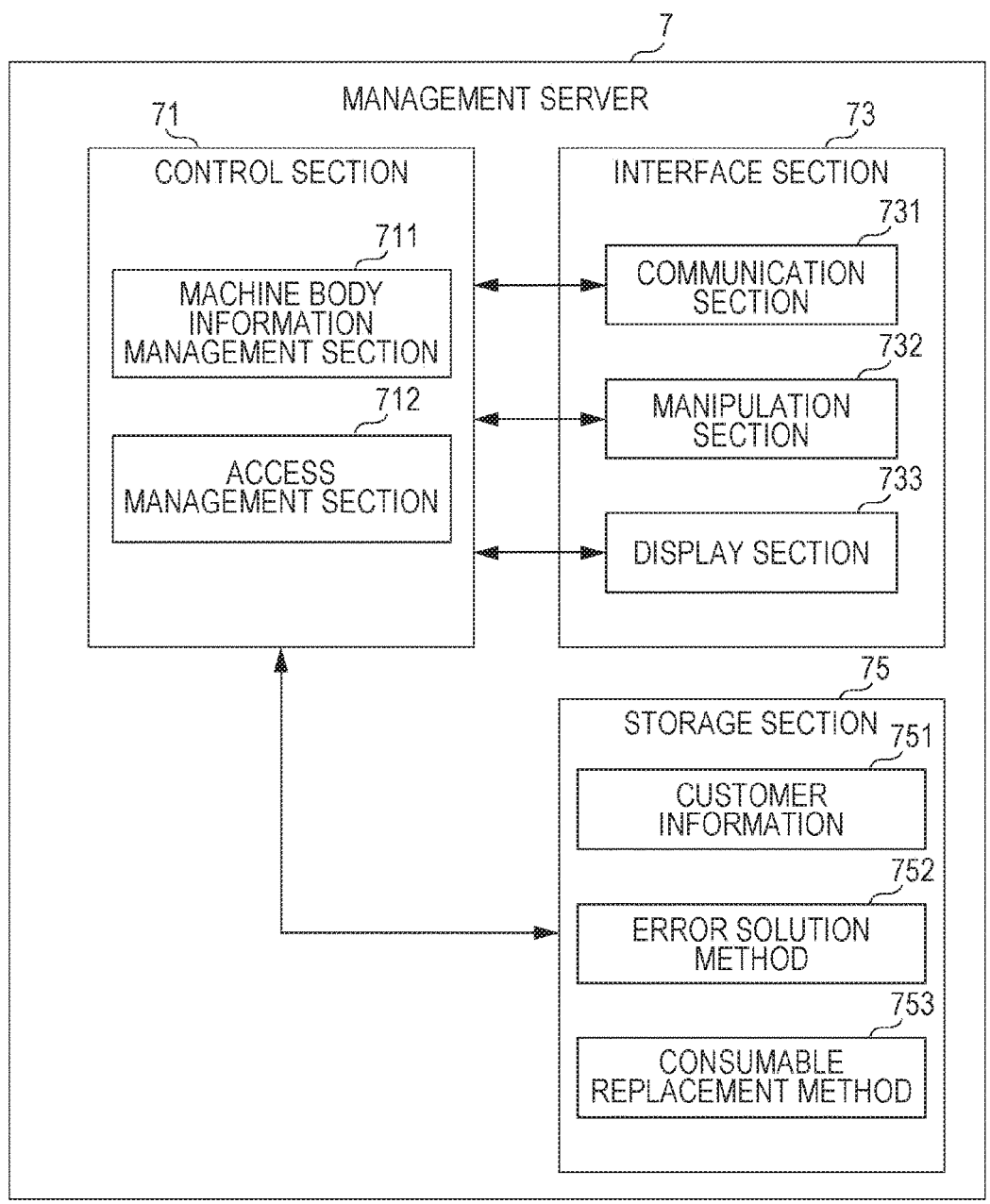
FIG. 5 is a block diagram illustrating an example of the configuration of a management server.

FIG. 5 is a block diagram illustrating an example of the configuration of the management server. The management server 7 includes a control section 71, an interface section 73, and a storage section 75. The control section 71 is a computer which includes a CPU and a RAM, and integrally controls operations which are performed in the management server 7. Accordingly, the interface section 73 and the storage section 75 are operated under the control of the control section 71. In addition, when the control section 71 executes a predetermined HMD control program, a machine body information management section 711 and an access management section 712 are constructed inside.

The machine body information management section 711 manages information relevant to the printer 3 (machine body) which is a work object for a worker. That is, the machine body information management section 711 acquires status information indicative of the state of the printing engine 351 of the printer 3 by receiving a detection result acquired by the sensor 352 from the printer 3, acquires consumption information indicative of the states of consumables (the amount of residual ink, the residual lifetimes of the components of a rotary machine, and the like) by receiving the counted result of the counter 353 from the printer 3, or acquires location information indicative of the location of the printer 3 by receiving the detection result acquired by the GPS module 37 from the printer 3.

The access management section 712 manages authority for each of the HMDs 5 to access the management server 7 and manages the display of work contents to the respective HMDs 5 to which the access authorities are applied. That is, when the worker inputs Identification Data (ID) and a password by manipulating a manipulation section 732 of the HMD 5, the access management section 712 receives the input content of the worker from the HMD 5. Further, when the input content is suitable, the access management section 712 applies access authority to a target HMD 5, and selects the HMD 5 as the display target for the work content to be executed by the printer 3.

That is, the number of printers 3, which is managed as the work object by the management server 7, is not limited to one, and may be plural. When a plurality of printers 3 are managed as above, it is necessary for the access management section 712 to specify the work contents of any one of the printers 3 to be displayed on the HMD 5. The specifying method is considered in various manners. For example, an identification code for identifying the printer 3, which is the work object, is input by the worker together with an ID and a password, and thus it is possible to specify the printer 3 based on the identification code. Otherwise, the location information indicative of the location of the HMD 5 is acquired by receiving the detection result of the GPS module 556 from the HMD 5, and thus it is possible to specify the printer 3 based on the location of the HMD 5 and the location of the printer 3. Specifically, the printer 3, which is the closet to the HMD 5, may be specified as the printer 3 of the work object.

The interface section 73 performs an interface function between the management server 7 and an external device or a worker. A communication section 731 is connected to the Internet 10, and performs communication with each of the printer 3 and the HMD 5 through the Internet 10. In addition, the manipulation section 732 includes a keyboard and a mouse which receive input manipulation from the worker, and a display section 733 includes a display or the like which displays various information to the worker. Meanwhile, the manipulation section 732 and the display section 733 may be integrally formed by, for example, a touch panel.

The storage section 75 includes a storage medium, such as a ROM, HDD or a RAM, and stores various programs (including the HMD control program) and data which are used in the management server 7. Specifically, the storage section 75 stores customer information 751 indicative of information related to a customer who uses the printer 3, an error solution method 752 indicative of a method for solving errors which has occurred in the printer 3, and a consumable exchanging method 753 indicative of a method for exchanging the consumables (ink, components of rotary machine, and the like) of the printer 3, as data.

Figure 6:
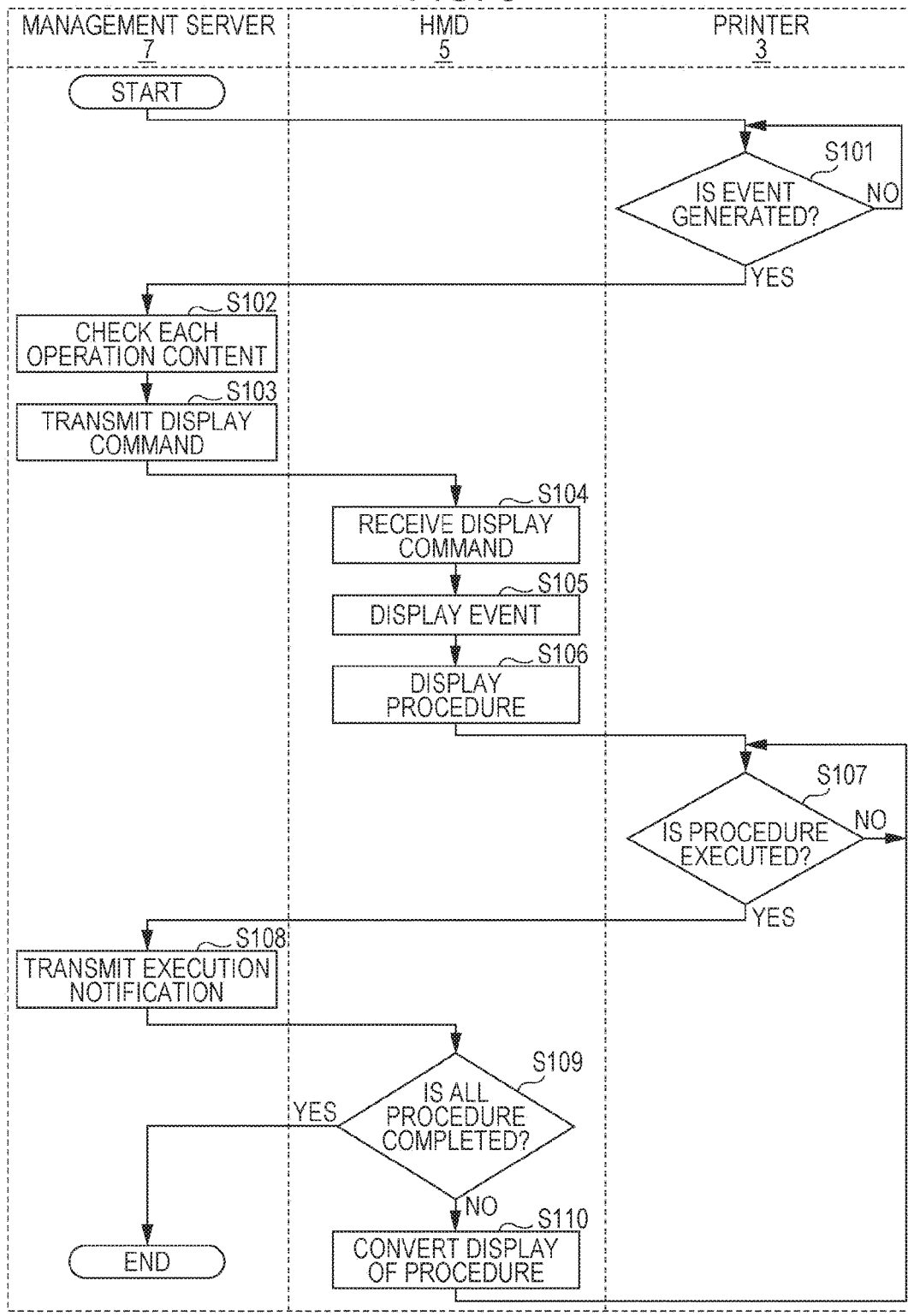
FIG. 6 is a flowchart illustrating an example of an operation which is performed to support workers.

FIG. 6 is a flowchart illustrating an example of an operation which is executed in the display system in order to support a plurality of workers who divide work for the printer. In the drawing, in order to show the execution subject in each step of the flowchart, columns for the management server 7, the HMD 5, and the printer 3 are respective provided and steps are shown in the respective columns of the execution subjects.

In step S101, it is checked whether or not an event has occurred in the printer 3. Specifically, the control section 31 of the printer 3 detects whether or not an event, such as a paper jam or low ink, has occurred based on the detection results of the sensor 352 and counter 353. Further, when the control section 31 detects the occurrence of an event ("YES" in step S101), the control section 31 transmits an event notification, which shows the content of the event which has occurred, to the management server 7.

In step S102, the management server 7, which receives the event notification, specifies work contents which should be executed by each worker in response to the event. Specifically, the machine body information management section 711 checks the content of the event, which occurs in the printer 3, based on the event notification which is received from the printer 3, and specifies work contents which should be executed by respective workers in response to the event. For example, when an error such as a paper jam occurs, the machine body information management section 711 specifies the work contents which should be executed by the respective workers with reference to the error solution method 752 in order to fix the paper jam. Otherwise, when consumables are depleted as in low ink, the machine body information management section 711 specifies the work contents which should be executed by the respective workers with reference to the consumable exchanging method 753 in order to exchange the consumables.

At this time, in order to divide work for one event between respective workers, different work contents are assigned to the respective workers. Meanwhile, when work contents, which are executed by the workers, include a plurality of procedures, the work contents of different workers are compared. If at least a part of the procedures is different, it is considered that the work contents are different from each other. If the work contents are specified for the respective workers in this manner, the access management section 712 checks the HMDs 5 (in other words, the HMDs 5 which are mounted on the workers who execute the target work contents) which are the destinations of the respective work contents in step S103. Further, the access management section 712 transmits a display command for displaying the content of the event and the relevant work contents to the respective HMDs 5.

When the operating section 552 of each of the HMDs 5 receives the display command from the management server 7 (step S104), the event which occurs in the printer 3 is displayed (step S105). Specifically, the operating section 552 extracts an Augmented Reality (AR) marker, which is attached to the printer 3, from the imaged image of the camera 514, and displays the content of the event in the location where a predetermined locational relationship with the AR marker is satisfied, using the display section 513. In this manner, each of the workers who wear the HMDs 5, can visually recognize the printer 3 through the lens 512, and can visually recognize the content of the event which is displayed by the display section 513 to overlap the printer 3. At this time, when the event is displayed while the location where the event has occurred in the printer 3 is shown, the worker can easily understand the location where the event has occurred, and thus it is suitable.

When predetermined time elapses after the event is displayed or when predetermined input manipulation is executed on the HMD 5 by the worker, the operating section 552 of each of the HMDs 5 cancels event display, and subsequently displays the procedure of the work contents (step S106). Specifically, the operating section 552 displays the procedure of the work contents using the display section 513 in a location where the predetermined locational relationship with the AR marker which is attached to the printer 3 is satisfied. In this manner, the worker who wears the HMD 5 can visually recognize the procedure of the work contents to overlap the printer 3. At this time, when the procedure is displayed while the procedure execution location for the printer 3, the worker can accurately understand the procedure execution location and can execute the work contents, and thus it is suitable.

Meanwhile, when the work contents includes a plurality of procedures, a procedure, in which the execution procedure is the earliest, is selectively displayed from among procedures which are not displayed (in other words, not performed) until now in step S106. At this time, in accordance with that the work contents of the respective workers are different from each other, procedures which should be displayed on the respective HMDs 5 may be different. In this case, even in a case of display for the same AR marker, images (procedures) which are displayed are different according to the HMDs 5. In other words, the management server 7 generates a display command toward the respective HMDs 5 and controls the respective HMDs 5 such that the respective HMDs 5 display different images (procedures) for the same AR marker.

In step S107, it is checked whether or not procedures for the printer 3 are executed. Specifically, the control section 31 of the printer 3 checks the presence or non-presence of the change in the state of the printing engine 351 (opening and closing cover, attachment and detachment of ink cartridge, or the like) in accordance with the execution of the procedures based on a result of detection performed by the sensor 352. Further, when the control section 31 detects the change in the state in accordance with the execution of the procedures ("YES" in step S107), an execution notification which indicates the execution of the procedures is transmitted to the management server 7. Further, in step S108, the management server 7, which receives the execution notification, transmits (sends) the execution notification to the respective HMDs 5.

When the execution notification is received from the management server 7, the operating section 552 of each of the HMDs 5 determines whether or not all procedures which are included in the work contents are completely displayed (step S109). Further, when procedures which are not displayed (in other words, not executed) remain ("NO" in step S109), the operating section 552 switches procedures to be displayed using the display section 513. In this manner, the workers who wear the HMDs 5 can visually recognize subsequent procedures of the executed procedures (that is, procedures of which the execution is checked in step S107) to overlap the printer 3. At this time, the procedure execution locations for the printer 3 are shown and the procedures are displayed, the workers can accurately understand the procedure execution locations and can execute the work contents, and thus it is suitable.

When the display of the procedures switches, the process returns to step S107, and steps S107 to S110 are repeated until all procedures which are included in the work contents are completely displayed. Further, when all procedures which are included in the work contents are completely displayed ("YES" in step S109), the process in the flowchart of FIG. 6 ends.

According to the flowchart, in the respective HMDs 5, the procedures of the work contents which should be executed by the workers who wear the HMDs 5 are sequentially displayed. Accordingly, when the respective workers execute the procedures which are displayed on the HMDs 5 mounted on the workers, the workers can appropriately execute the allocated work contents.

Subsequently, more specific example, that is, contents, which are displayed by the respective HMDs 5 according to the flowchart of FIG. 6 when a paper depletion error occurs in the printer 3, will be described with reference to FIGS. 7A to 10B. Here, FIGS. 7A to 10B are diagrams illustrating examples of contents which are visually recognized by the workers who wear the respective HMDs when the paper depletion error occurs, and illustrate a situation in which another element (text or an arrow) displayed by the display section 513 appropriately overlaps the printer 3 which is visually recognized by the workers through the lenses 512. Specifically, FIGS. 7A to 10B illustrate a case in which two workers wear the respective HMDs 5 and executes work content corresponding to the paper depletion error, FIGS. 7A, 8A, 9A, and 10A illustrate contents which are visually recognized by one worker (first worker) who wears a first HMD 5, and FIGS. 7B, 8B, 9B, and 10B illustrate contents which are visually recognized by another worker (second worker) who wears a second HMD 5.

Figure 8A:
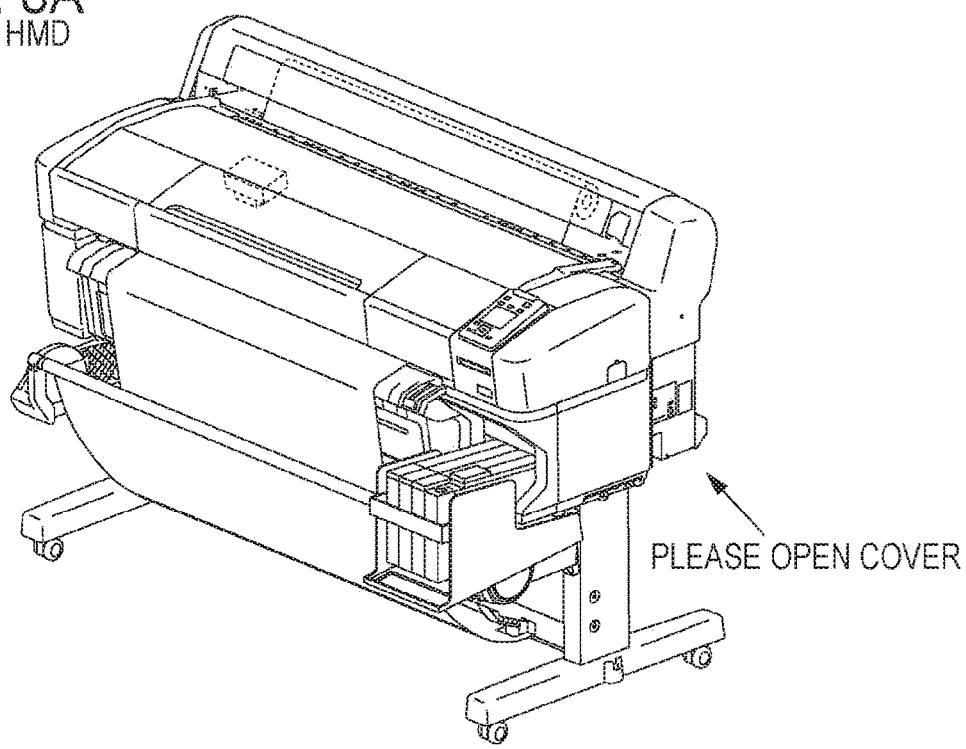
FIGS. 8A and 8B are diagrams illustrating examples of visually recognized contents of the workers through the HMDs when the paper depletion error is generated.
Figure 8B:
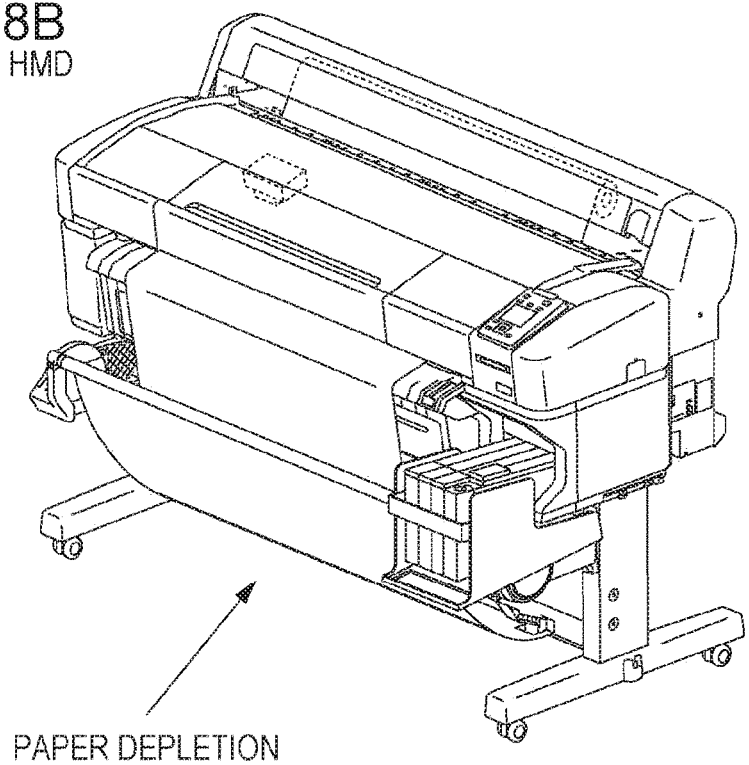

When the occurrence of the paper depletion error is checked in step S101, the management server 7 checks work contents which are respectively displayed on the first and second HMDs 5 (step S102). As a result, it is determined that respective procedures (first work content) in FIGS. 8A to 10A are displayed on the first HMD 5 in order of drawing numbers, and it is determined that a procedure (second work content) in FIG. 9B is displayed on the second HMD 5. Further, a display command which is generated according to the result of the determination is transmitted to the first and second HMDs 5, respectively (step S103).

Figure 7A:
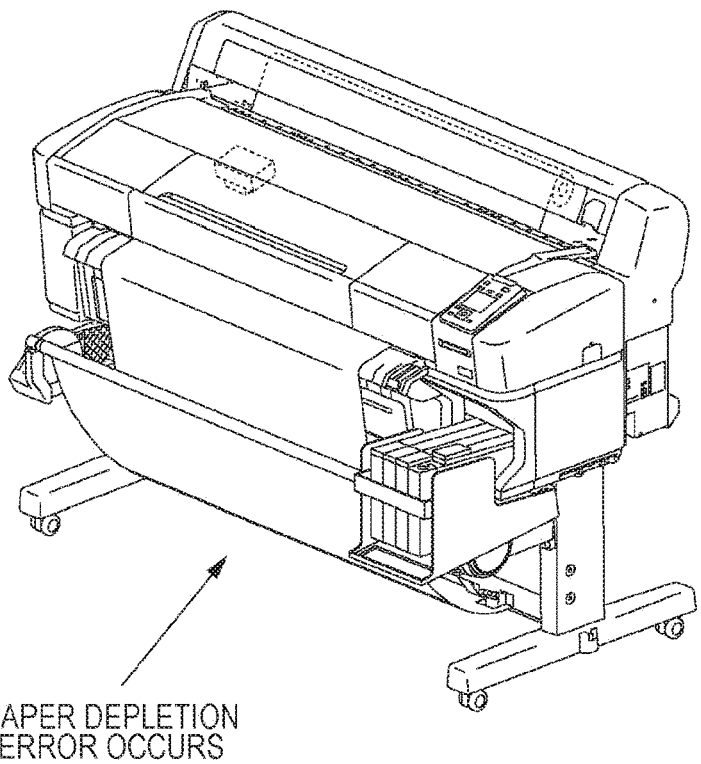
FIGS. 7A and 7B are diagrams illustrating examples of visually recognized contents of the workers through the HMDs when a paper depletion error is generated.
Figure 7B:
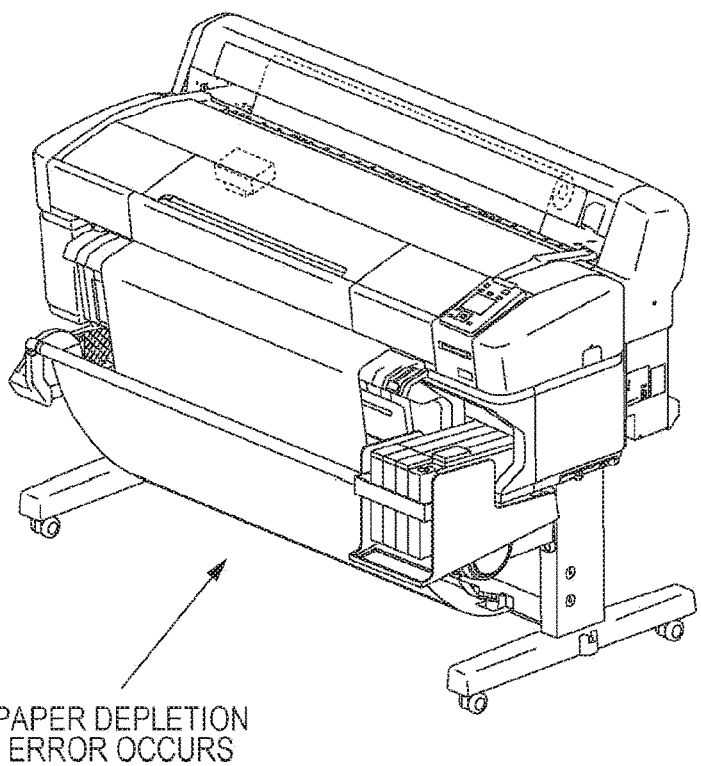

When the first and second HMDs 5 respectively receive the display command (step S104), the content of the event, such as "paper depletion error occurs" is displayed for the printer 3 (step S105) as illustrated in FIGS. 7A and 7B. Subsequently, in step S106, the first HMD 5 displays a procedure "open a cover" for the printer 3 (FIG. 8A). Meanwhile, in the example, it is necessary to cause the second worker who wears the HMD 5 to wait for the execution of the procedure until the first worker who wears the HMD 5 completes the procedure in FIG. 8A. Here, the second HMD 5 does not display the procedure until the procedure in FIG. 8A is completed. For example, as shown in FIG. 8B, the second HMD 5 maintains the display in FIG. 7B or performs display for prompting waiting.

When it is detected that the cover is open (step S107), the management server 7 transmits an execution notification that indicates that the cover is open to the first and second HMDs 5, respectively (step S108). When the first and second HMDs 5 receive the execution notification, the first and second HMDs 5 respectively display the procedures of FIGS. 9A and 9B (step S110). Specifically, in order to divide work, in which a new roll is mounted on the right and left roll holders that support a web roll, between two workers, the first HMD 5 displays a procedure for the left side roll holder and the second HMD 5 displays a procedure for the right side roll holder.

Figure 9A:
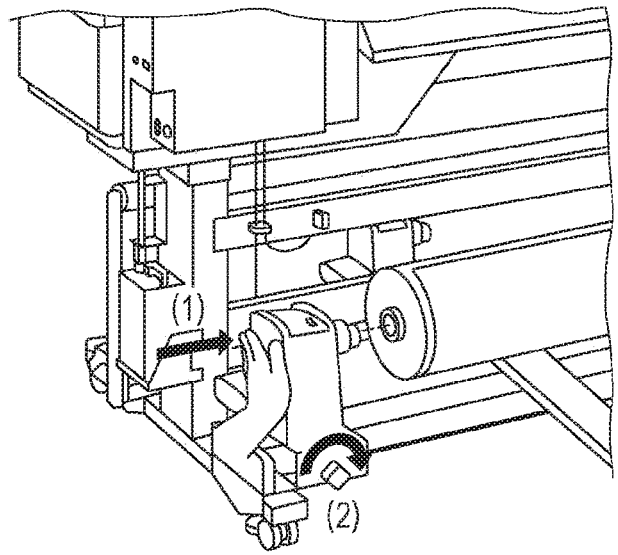
FIGS. 9A and 9B are diagrams illustrating examples of visually recognized contents of the workers through the HMDs when the paper depletion error is generated.
Figure 9B:
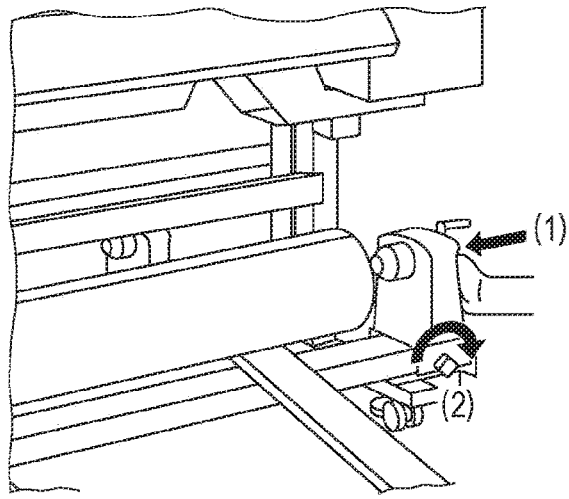
Figure 10A:
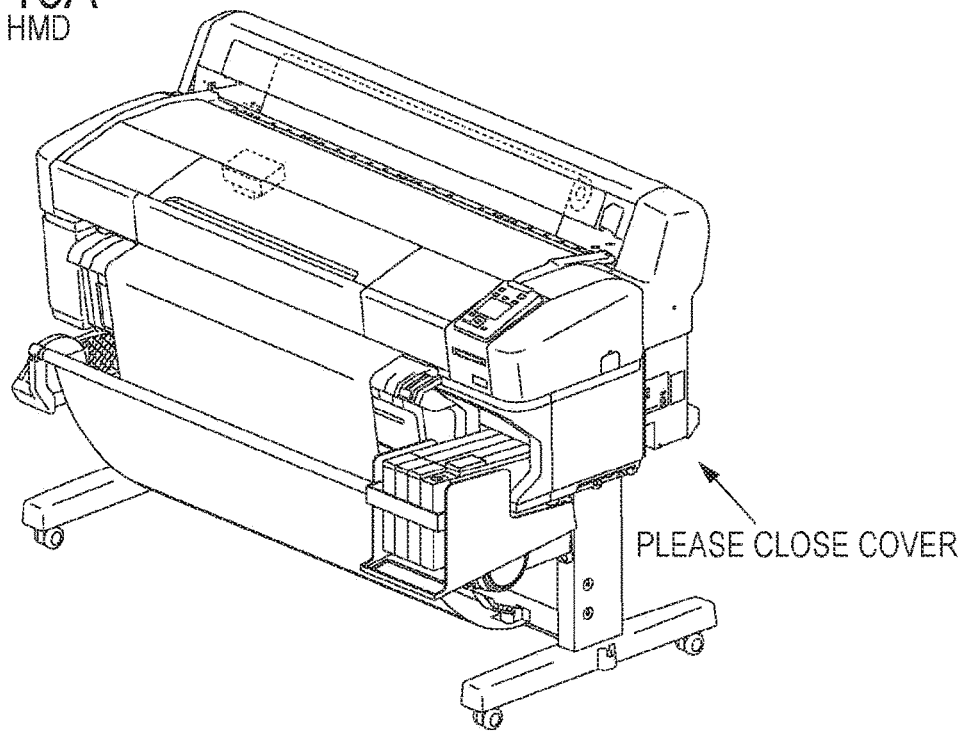
FIGS. 10A and 10B are diagrams illustrating examples of visually recognized contents of the workers through the HMDs when the paper depletion error is generated.
Figure 10B:
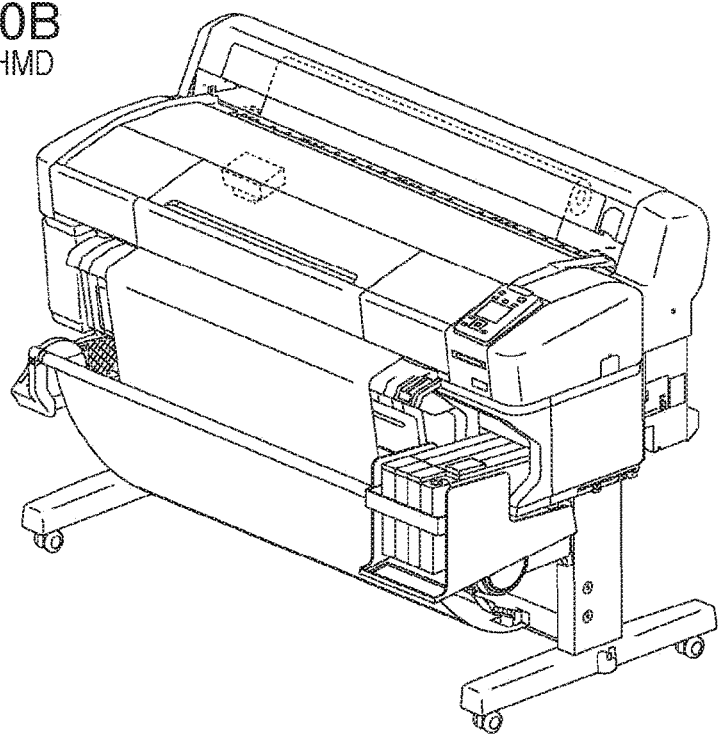

When the execution of both the procedures in FIGS. 9A and 9B is detected (step S107), the management server 7 transmits an execution notification which indicates the execution of both the procedures to the respective first and second HMDs 5 (step S108). When the execution notification is received, the first HMD 5 displays a procedure "close the cover" for the printer 3 (FIG. 10A). Further, when the first worker who wears the HMD 5 executes the procedure, the work corresponding to the paper depletion error, that is, the mounting of the new roll is completed.

As described above, in the embodiment, which is configured as above, the work content of the worker for the printer 3 is displayed on the HMD 5 which is mounted on the worker. Accordingly, the workers can easily execute their own work contents for the printer 3.

In addition, when the work contents include a plurality of procedures, the management server 7 sequentially shows the plurality of procedures to the workers. In this manner, the workers can securely execute the plurality of procedures while sequentially checking the plurality of procedures.

In addition, the printer 3 detects the change in the state, which is generated in accordance with the execution of the work. Further, the management server 7 switches the procedures which are shown to the workers on the HMDs 5 according to the detected change in the state of the printer 3. In this manner, it is possible to show the suitable procedures on the HMDs 5 according to the progress of the work for the printer 3.

Particularly, in examples illustrated in FIGS. 8A to 10B, the change in the state of the printer 3, which is generated in accordance with the execution of the work content (the procedure illustrated in FIG. 9B) by another worker, is detected, and the procedure, which is shown on the first HMD 5 which is mounted on one worker switches according to the detection result, is switched. In this manner, it is possible to show a suitable procedure according to the progress of work performed by another worker to the first HMD 5 of one worker.

In addition, it is configured that it is possible to display different work contents on the respective HMDs 5. Accordingly, the respective workers can execute different work contents on the same printer 3 according to the display of the HMDs 5, and thus it is possible to perform complicated work as a group.

In addition, work contents are displayed using portable HMDs 5. In the configuration, the workers can execute the work contents while carrying the HMDs 5, thereby providing high convenience for the workers.

As described above, in the embodiment, the display system 1 corresponds to an example of the "display system" according to the invention, the printer 3 corresponds to an example of the "work object" according to the invention, the HMD 5 corresponds to an example of the "display device" according to the invention, the management server 7 corresponds to an example of each of the "storage device" and the "control device" according to the invention, the HMD 5 corresponds to an example of the "portable display device" according to the invention, the communication section 553 corresponds to an example of the "reception section" according to the invention, the display section 513 corresponds to an example of the "display section" according to the invention, the management server 7 corresponds to an example of the "display control device" according to the invention, the storage section 75 corresponds to an example of the "storage section" according to the invention, and the control section 71 corresponds to an example of the "control section" according to the invention.

Meanwhile, the invention is not limited to the above-described embodiment, and various modifications can be added to the embodiment without departing from the gist of the invention. Accordingly, for example, the execution subject in each step of the flowchart illustrated in FIG. 6 may be appropriately modified. Specifically, it is possible to appropriately perform modification in which the determination in step S109 is executed by the management server 7.

In addition, the respective HMDs 5 in the embodiment sequentially switch the plurality of procedures which are included in the work contents one by one, and show the procedures to the workers. Although not described above, various detailed modes, in which procedures are sequentially shown (in other words, informed) to the workers, may be considered. For example, only a procedure which should be executed earliest is displayed on the HMD 5 from among the procedures which are not executed, and the content of the procedure which is displayed on the HMD 5 may be sequentially switched according to the execution of the procedure. Otherwise, all the plurality of procedures which are included in the work contents are displayed on the HMDs 5, only one target procedure is high-lighted and the procedure is shown to the worker, and thus a procedure to be high-lighted may be sequentially switched according to the execution of the procedure.

In addition, in the embodiment, the procedure to be displayed on the HMD 5 is switched based on the result acquired by detecting the change in the state of the printer 3 by the sensor 352. However, reference in which the procedure to be displayed on the HMD 5 is switched is not limited thereto. Here, the procedure to be displayed on the HMD 5 may be switched based on, for example, the result acquired by inputting the progress of the work by the worker. Specifically, for example, the touch pad 554, the manipulation buttons 555, and the like of each of the HMDs 5 are formed such that it is possible to input the progress of work. Further, when the input of the progress of the work is present, each of the HMDs 5 determines that the procedure is executed ("YES" in step S107) and transmits the execution notification to the management server 7. Further, similarly to the above description processes in step S108 to S110 may be executed.

That is, in the configuration, the management server 7 receives manipulation of the worker who inputs the progress of the work for the printer 3 (steps S107 and S108). Further, the procedure which is shown to the worker on the HMD 5 is switched according to the result of input of the progress of the work (step S110). In this manner, it is possible to show the suitable procedure on the HMD 5 according to the progress of the work for the printer 3.

At this time, the procedure, which is displayed on the first HMD 5 of one worker, may be switched based on the result acquired by inputting the progress of own work content into the second HMD 5 by another worker. In this manner, it is possible to display a suitable procedure according to the progress of the work performed by another worker (second worker) on the first HMD 5 of the worker (first worker). In addition, the work content of another worker or one worker may be displayed on the HMD 5 of further another worker who performs work in a group. Therefore, it is easy to understand the state of the progress of the work. In this case, the procedure which should be executed by one worker or another worker may be displayed such that the respective workers easily understand the work.

In addition, the management server 7 may be configured such that the plurality of work contents, which can be executed on the printer 3, are stored, and the input manipulation, which is performed by the worker in order to select one work continent from among the plurality of work contents, is received. Specifically, each of the HMDs 5 accesses the management server 7, downloads a plurality of work contents which are candidates, and displays the list of the work contents toward the worker. Further, the worker manipulates the touch pad 554 and the manipulation buttons 555, and selects work content which will be executed by the worker from the list. After the HMD 5 receives the list, the HMD 5 transmits the selected work content to the management server 7. The management server 7 returns the display command for displaying the work content to the HMD 5. As a result, the HMD 5 displays the work content selected by the worker. In this manner, the worker can display the work content on the HMD 5 which is mounted on the worker after recognizing the work content which should be executed by the worker.

In addition, the management server 7 may show timing, in which the respective workers simultaneously perform work, on the respective HMDs 5 which are mounted on the respective workers. Specifically, it is considered that the timing, in which work is simultaneously performed, is displayed on the HMDs 5 through countdown. In addition, when it is necessary to wait, display which enables to understand a waiting state is performed. In this manner, the respective workers can easily combine timing in which work is executed.

In addition, it is possible to appropriately modify the configuration of the display system 1. For example, the functions of the machine body information management section 711 and the access management section 712 of the management server 7 may be embedded in the printer 3. Otherwise, one of the plurality of HMDs 5 is used as a master, and the functions of the machine body information management section 711 and the access management section 712 may be embedded in the HMD 5 of the master.

In addition, in the embodiment, a case in which a transmission type HMD 5 is used as the "display device" according to the invention is shown. However, it is possible to use a non-transmission type (that is, non-see-through type) HMD 5 which displays peripheral images imaged by the camera 514, a smart phone, a tablet, or a laptop computer as the "display device" (first display device, second display device, or the like) according to the invention.

In addition, although display is performed on the HMD 5 through display control using the AR marker, display may be performed on the HMD 5 through display control using the markerless AR.

In addition, a case in which the printer 3 is used as the "work object" according to the invention and a plurality of workers who divide work for the printer 3 are supported is described as an example. However, it is possible to preferably use the invention when supporting division of a plurality of workers who works in a medical field, welfare or a construction site.

The entire disclosure of Japanese Patent Application No. 2015-012008, filed Jan. 26, 2015 is expressly incorporated by reference herein.

What is claimed is:
1. A display system comprising:
a first head mounted display that is viewable by only a first user to conduct first work for an electronic device, the first work relating to an error of the electronic device;
a second head mounted display that is viewable by only a second user to conduct second work for the electronic device, the second work relating to the error of the electronic device;
a memory configured to store computer-readable instructions relating to the first work and the second work; and
a processor configured to execute the computer-readable instructions such that the processor is configured to:

display a first work content of the first work on the first head mounted display and the first work content of the second work on the second head mounted display so that the first and second head mounted displays display the first work content;

display a second work content of the first work on the first head mounted display when the processor is configured to display a work waiting content of the second work on the second head mounted display; and display a third work content of the first work on the first head mounted display and the third work content of the second work on the second head mounted display after the first user completes the second work content of the first work, wherein the first work content is different from the second work content and the third work content, and the second work content is different from the third work content, the work waiting content is a notification of a waiting state for the second user, one of the first work content and the third work content includes an indication of a start time at which the first and second users start one of the first work content and the third work content at the same time, and the first, second, and third work contents relate to a solution of the error of the electronic device.

2. The display system according to claim 1,
wherein, when the first work or the second work has a plurality of work contents, the processor is configured to sequentially display the plurality of work contents on the first head mounted display or the second head mounted display.

3. The display system according to claim 2,
wherein the processor is configured to switch the plurality of work contents which are displayed on the first head mounted display or the second head mounted display according to a state change of the electronic device.

4. The display system according to claim 2,
wherein the processor is configured to receive an input manipulation for progress of the first work and the second work for the electronic device, and the processor is configured to switch the plurality of work contents which are displayed on the first head mounted display or the second head mounted display according to an input result of the progress of the first work and the second work.

5. The display system according to claim 1,
wherein the processor is configured to detect a location where the first work or the second work is performed for the electronic device so that the processor is configured to display the location on the first head mounted display or the second head mounted display.

6. The display system according to claim 1,
wherein the first work and the second work are different from each other.

7. The display system according to claim 1,
wherein the indication of the start time that is displayed on each of the first head mounted display and the second head mounted display corresponds to a countdown.

8. The display system according to claim 1,
wherein each of the first head mounted display and the second head mounted display is a portable head mounted display.

9. The display system according to claim 1,
wherein the electronic device is a printer, and
wherein the processor is embedded in one of the printer, a server which is independently provided on an outside of the printer, and one of first head mounted display and the second head mounted display.

10. A display control device comprising:
a memory configured to store computer-readable instructions relating to first work and second work, the first work being viewable on a first head mounted display by only a first user to conduct the first work for an electronic device, the second work being viewable on a second head mounted display by only a second user to conduct the second work for the electronic device, the first work and the second work relating to an error of the electronic device; and a processor configured to execute the computer-readable instructions such that the processor is configured to:
display a first work content of the first work on the first head mounted display and the first work content of the second work on the second head mounted display;

display a second work content of the first work on the first head mounted display when the processor is configured to display a work wait content of the second work on the second head mounted display; and display a third work content of the first work on the first head mounted display and the third work content of the second work on the second head mounted display after the first user completes the second work content of the first work, wherein the first work content is different from the second work content and the third work content, and the second work content is different from the third work content, the work waiting content is a notification of a waiting state for the second user, one of the first work content and the third work content includes an indication of a start time at which the first and second users start one of the first work content and the third work content at the same time, and the first, second, and third work contents relate to a solution of the error of the electronic device.

11. A display method for causing a processor to execute computer-readable instructions stored in a memory, the display method comprising executing on the processor the step of:
displaying a first work content of first work on a first head mounted display that is viewable by only a first user to conduct the first work for an electronic device and displaying the first work content of second work on a second head mounted display that is viewable by only a second user to conduct the second work for the electronic device, the first work and the second work relating to an error of the electronic device;

displaying a second work content of the first work on the first head mounted display when the processor is configured to display a work wait content of the second work on the second head mounted display; and displaying a third work content of the first work on the first head mounted display and the third work content of the second work on the second head mounted display after the first user completes the second work content of the first work, wherein the first work content is different from the second work content and the third work content, and the second work content is different from the third work content, the work waiting content is a notification of a waiting state for the second user, one of the first work content and the third work content includes an indication of a start time at which the first and second users start one of the first work content and the third work content at the same time, and the first, second, and third work contents relate to a solution of the error of the electronic device.

12. The display control device according to claim 10, wherein the electronic device is a printer.

13. The display method according to claim 11, wherein the electronic device is a printer.

14. The display control device according to claim 10, wherein the indication of the start time that is displayed on each of the first head mounted display and the second head mounted display corresponds to a countdown.

15. The display method according to claim 11, wherein the indication of the start time that is displayed on each of the first head mounted display and the second head mounted display corresponds to a countdown.

* * * * *